A. MOORE.
PLOW.
APPLICATION FILED JULY 11, 1919.
1,349,623. Patented Aug. 17, 1920.
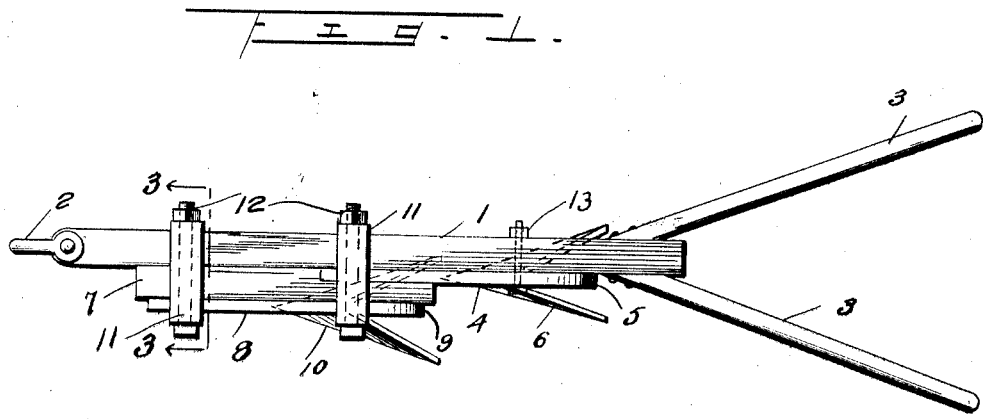
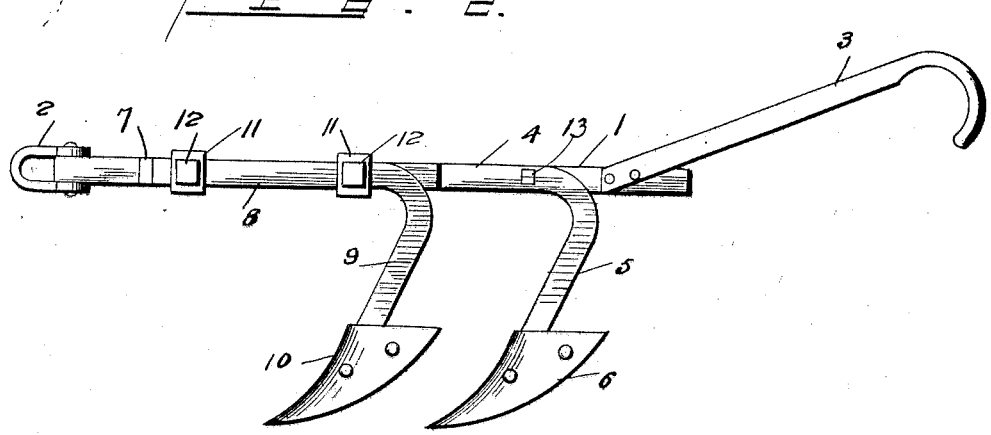
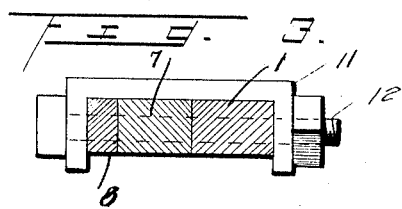
Inventor.
A. Moore.
By [signature]
Attorney.

UNITED STATES PATENT OFFICE.

ASBURY MOORE, OF SENECA, SOUTH CAROLINA.

PLOW.

1,349,623.  Specification of Letters Patent.  Patented Aug. 17, 1920.

Application filed July 11, 1919. Serial No. 310,013.

*To all whom it may concern:*

Be it known that I, ASBURY MOORE, a citizen of the United States, residing at Seneca, in the county of Oconee and State of South Carolina, have invented certain new and useful Improvements in Plows; and I do hereby declare the following to be a full, clear, and exact description of the invention, such as will enable others skilled in the art to which it appertains to make and use the same.

This invention relates to plows, and more particularly to a plow specially intended for cultivating cotton and similar crops.

One of the main objects of the invention is to provide a plow of the character stated of simple construction and which includes a plurality of cultivator shovels arranged in stepped relation so as to facilitate the cultivating operation and permit a greater area to be cultivated at each trip of the plow. A further object is to provide a plow which is so constructed as to be readily assembled or disassembled, all of the parts when assembled being secured rigidly in position. Further objects will appear from the detailed description.

In the drawings:

Figure 1 is a top plan view of a plow constructed in accordance with my invention.

Fig. 2 is a side view.

Fig. 3 is a section taken substantially on line 3—3 of Fig. 1.

The plow is provided with a beam 1 of known construction provided at its forward end with an attaching clevis 2 and at its rearward end with rearwardly and upwardly inclined, and rearwardly diverging handles 3. A cultivator shank 4 is positioned at one side of beam 1 adjacent the rearward end thereof, this shank being provided with a downwardly extending standard 5, at the rearward end thereof, to the lower end of which is secured a cultivator shovel 6 of suitable type having laterally extending wings. The forward end portion of shank 4 fits into a cutout or recess provided in the inner face of a block 7 which is positioned at the side of beam 1 in advance of shank 4, this block serving as a spacing member for a second cultivator shank 8 similar to shank 4 provided at its rearward end with a downwardly extending standard 9 carrying at its lower end a shovel 10 similar to the shovel 6. Substantially U-shaped straps 11 fit snugly over and about the beam 1 and block 7 and shank 8, the arms of these straps being provided adjacent their lower ends with openings to receive securing bolts 12 which are inserted through the straps and through the block 7 and beam 1 and the shank 8. As will be noted more clearly from Fig. 1, the rearward bolt 12 also passes through the forward portion of shank 4, an additional securing bolt 13 being inserted through this shank adjacent the rearward end thereof and through the beam 1, all of the bolts being provided with suitable securing nuts screwed thereon. By this arrangement, the cultivator shanks are detachably secured to the beam 1 of the plow, the means for securing the shank 8 and the forward end of shank 4 to the beam also serving to detachably secure the spacing block 7 in position. By providing the spacing block 7 the cultivator shovels 6 and 10 are disposed in stepped relation so that the point of the rear shovel 6 is positioned substantially in alinement with the inner wing of the forward shovel 10 thus facilitating the cultivating operation while permitting a relative broad strip to be cultivated at one trip of the plow.

In the event that it is desired to use the plow in the manner of a single shovel or center-breaker plow, the block 7 and straps 11, together with the cultivator shank 8 may be readily detached, the rearward bolt 12 being then reinserted through the forward end portion of shank 4 and beam 1, the shank 4 being thus securely fastened to the beam. This renders it possible to readily convert the cultivator into either a single shovel or a two-shovel cultivator to suit requirements.

As will be readily understood, it may be found desirable under certain conditions to slightly alter the details of construction and arrangement of the invention, and I intend to include all such variations, as fall within the scope of the appended claim, in this application in which a preferred form only of my invention is disclosed.

What I claim is:

In a plow, a beam, a cultivator shank mounted adjacent one side of said beam and detachably secured thereto adjacent its rearward end, said shank being provided with a depending standard and a cultivator shovel carried thereby, a block positioned at one side of the beam adjacent said shank and having the end portion of its inner face recessed to receive the forward end portion of the cultivator shank, a cultivator shank mounted on the outer face of said block and provided with a depending standard carrying a cultivator shovel, and securing bolts inserted through the shank carried by the block and through said block and the beam, one of said bolts passing through the forward end portion of the first mentioned cultivator shank.

In testimony whereof I affix my signature in presence of two witnesses.

ASBURY MOORE.

Witnesses:
P. S. SINGLETON,
JAS. ALEXANDER.